United States Patent [19]

Cremen

[11] Patent Number: 4,785,840
[45] Date of Patent: Nov. 22, 1988

[54] METHOD OF AND APPARATUS FOR CONTROLLING MATERIAL FLOW

[76] Inventor: Anthony B. Cremen, 81-Mount Pellan Drive, Glenvista Extension, 5 Transvaal, South Africa

[21] Appl. No.: 20,596

[22] Filed: Mar. 2, 1987

[51] Int. Cl.[4] ............................................. G05D 7/01
[52] U.S. Cl. ........................................ 137/2; 137/460; 137/499; 193/21; 251/292; 251/301
[58] Field of Search ................. 137/2, 498, 499, 460; 193/21; 198/532; 222/558; 251/292, 301

[56] References Cited

U.S. PATENT DOCUMENTS

| 796,074 | 8/1905 | Hunt | 193/21 |
| 843,959 | 2/1907 | McBride | 137/499 |
| 2,911,002 | 11/1959 | Larkfeldt | 137/499 |
| 3,407,839 | 10/1968 | Hardy | 137/499 X |
| 3,575,376 | 4/1971 | Arvidson | 251/301 X |

Primary Examiner—Robert G. Nilson
Attorney, Agent, or Firm—McGlew and Tuttle

[57] ABSTRACT

The passage of ore through a pass is controlled by means of a rotatably mounted arcuate door which is orientated so that a convex face of the door faces oncoming material flow. When the rate of material flow is so high that the door is forced open, fins on a concave face of the door react with the material flow and a force is generated which rotates the door to a blocking position at which the rate of material flow is substantially reduced.

5 Claims, 2 Drawing Sheets

METHOD OF AND APPARATUS FOR CONTROLLING MATERIAL FLOW

BACKGROUND OF THE INVENTION

This invention relates generally to the control of material flow and more particularly is concerned with controlling the flow of material such as ore, rock and mud through an ore pass on the mines.

Material of the kind described is in many instances channelled through chutes and the flow of material through such a chute is controlled by means of a door. Under certain conditions, when the flow rate of the material is extremely high, it becomes difficult if not impossible effectively to operate a chute door. The excess material can flood the haulage, i.e. the tunnel or passage beneath the chute and the chute operator is thereby exposed to acute danger.

Apart from leading to fatalities excess material flow of the kind described, referred to as a rush, blocks the haulage and can severely hamper production.

SUMMARY OF THE INVENTION

The invention provides a method of controlling material flow through a passage which includes the steps of moving a door, which is positioned at a first location in the passage, thereby to regulate the rate of material flow through the passage, and of allowing the door to be moved by the material, when its flow rate exceeds a predetermined level, to a second location in the passage at which the door substantially reduces the material flow rate through the passage.

The door, at the second location, may reduce the material flow to less than 20% of the maximum possible flow rate through the passage, or may substantially seal off the passage to material flow. In a preferred form of the invention the flow rate is reduced to between 5% and 20% of the maximum possible flow rate and suitably to the order of 15%.

The first location may be at or near an inlet end to the passage, and the second location may be at or near an outlet end from the passage, or vice versa.

The invention also provides a method of controlling material flow through a passage which includes the steps of using a movable door to regulate the rate of material flow through the passage, and, when the rate of material flow through the passage reaches a predetermined level, of allowing the door to be moved by the material to a position at which the door substantially reduces the rate of material flow through the passage.

The invention further extends to apparatus for controlling material flow which includes a housing in which is formed a passage through which the material passes, and at least one door which is located in the passage, the door, at a control position, being movable by means of a control device to regulate the rate of material flow through the passage, the door further being movable by the material, when the rate of material flow through the passage reaches a predetermined level, to a blocking position at which the door substantially reduces the rate of material flow through the passage.

The control device may include a handle which is engaged with the door, the apparatus including means for disengaging the handle from the door when the door moves to a predetermined position. This means may take the form of a cam or similar device which effectively displaces the handle from an operative position at which it can cause door movement, to an inoperative position, when the handle and the door are moved to a predetermined orientation relatively to the housing.

The door may be mounted for rotation in the passage about an axis, e.g. on one or more axles, or alternatively, the door may be mounted on guides such as rollers which permit the door to be moved along a predetermined path.

The housing may be formed with at least one removable closure through which material can be extracted from the passage. This closure may for example be located on an upper side of the housing or, alternatively or additionally, on a lower side of the housing. The closure could also be on a side wall of the housing.

Preferably the door, in cross-section, has a shape which is at least partly arcuate and, in the control position, presents a face which is at least partly convex to oncoming material flow through the passage. The door in the blocking position may then present at least a partly concave face to oncoming material flow.

The door may include means which is adapted to react with the material, at least when the rate of material flow reaches the predetermined level, thereby at least to assist in generating force for causing movement of the door to the blocking position. The means may be provided at least on a face of the door. This means may comprise at least one member or formation on the face. For example, in one form of the invention, the means consists of one or more fins or ribs or similar raised formations on a face of the door. The fins may extend generally parallel to an axis about which the door is rotatable. In a different form of the invention one or more members are suspended from a face of the door. These members may consist of chains, cables, rods or the like which are so positioned that when the door reaches a predetermined orientation, consistent with a maximum flow rate of material through the passage, the material impinges on them and thereby causes a force to be generated which causes closure of the door. This face of the door may be at least partly concave.

The invention further extends to apparatus for controlling material flow which includes a housing in which is formed a passage through which the material passes, at least one door which is mounted for rotation, at least to a limited extent, in the passage, and means for moving the door, the door including an outer face which is at least partly convex and which is presented to oncoming material flow through the passage, and an inner face which is at least partly concave and which has one or more formations or members adapted to engage with the material passing through the passage, when the door reaches a predetermined orientation relatively to the housing, thereby to cause the door to be moved to a position at which material flow through the passage is substantially reduced.

In a variation of the invention the apparatus includes a passage in which is formed a housing through which the material passes, and a door which is mounted in the passage for rotation about an axis which is substantially transverse to the direction of material flow through the passage, the door being rotatable from a first position at which a first side of the door is presented to oncoming material flow through the passage to a second position at which the first side generally faces in the direction in which material flows from the passage.

The door in cross-section is preferably susbtantially arcuate and the first side is convex.

BRIEF DESCRIPTION OF THE DRAWINGS

The invention is further described by way of example with reference to the accompanying drawings in which.

DESCRIPTION OF PREFERRED EMBODIMENT

Figure 1:
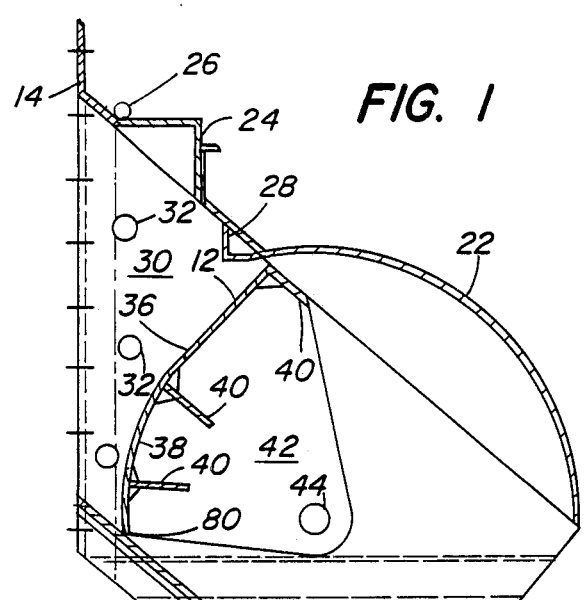
FIG. 1 is a side view of apparatus according to the invention with a door in a controlled, closed position.
Figure 2:
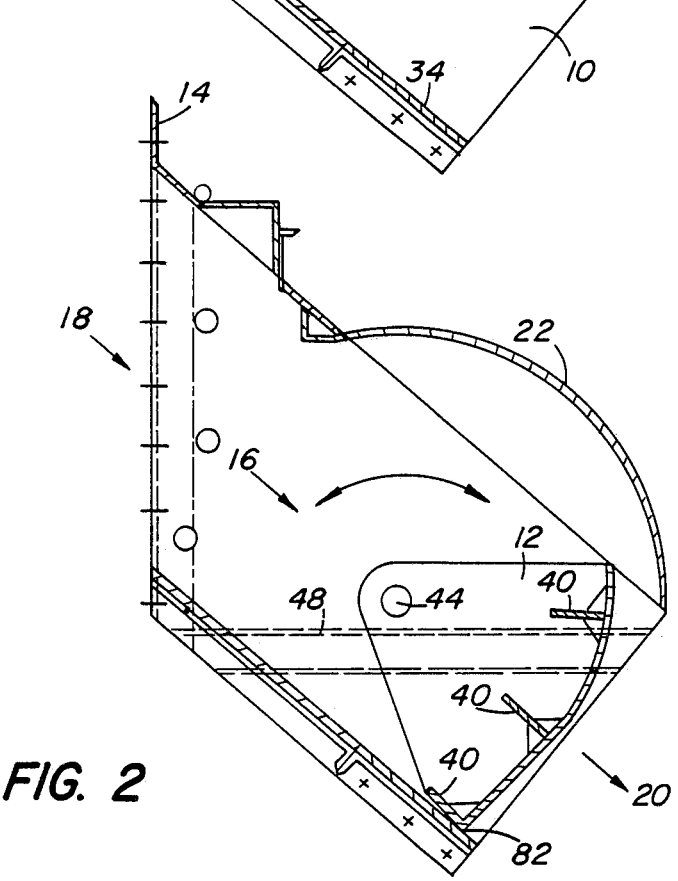
FIG. 2 is a side view of the apparatus of FIG. 1 with the door in blocking position.

FIGS. 1 and 2 illustrate apparatus according to the invention for controlling the flow of material through an ore pass. The apparatus includes a housing 10 and a door 12 which is mounted in the housing. The housing includes a flange 14 whereby the apparatus can be installed in a chute in the ore pass. This aspect is not important for an understanding of the invention and therefore is not further elaborated on.

The housing 10 defines a passage 16 which has an inlet 18 and an outlet 20. The housing has a domed closure 22, on its upper surface, which is pivotally attached to the remainder of the housing. On the upstream side of the closure, the housing includes an inspection cover 24 which is fixed to the housing by means of hinge 26. Normally the inspection cover is kept closed by means of an adequate locking device, not shown.

A deflector 28 is positioned between the inspection cover 24 and the closure 22, on the inner face of the upper surface of the housing. The housing has side walls 30 and opposing registering holes 32 are formed in the side walls on the upstream side of the door 12.

A second closure 34 forms part of the lowermost wall of the housing.

The door 12 includes a partly convex outer face 36, an inner face 38 of complementary concave shape, ribs 40 which are welded to the inner face 38, and side walls 42 which are engaged with stub axles 44 which extend through the side walls 30 of the housing. The axles 44 are mounted on bearings 46 secured to fixed structure 48 on the outer surfaces of the side walls 30, see FIG. 4.

Figure 3:
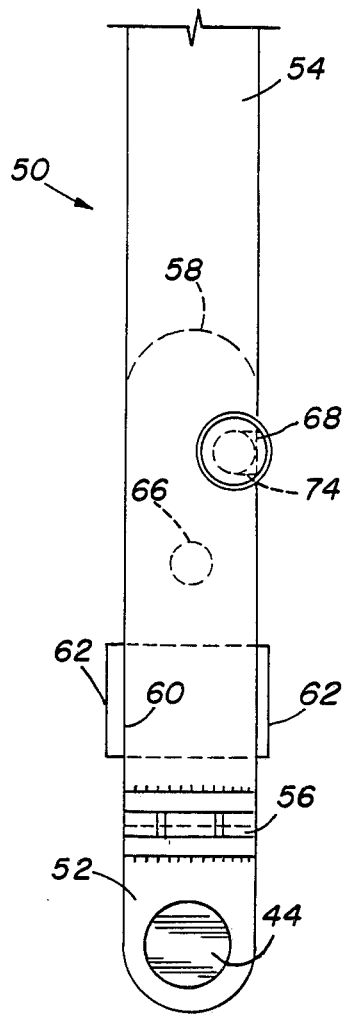
FIG. 3 is a plan view of portion of a handle used on the door of the apparatus of FIG. 1.
Figure 4:
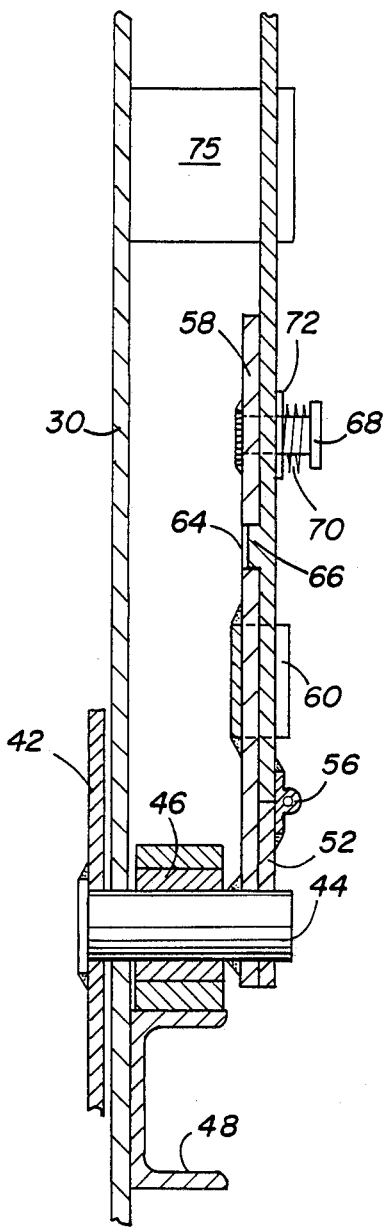
FIG. 4 is a side view of the handle shown in FIG. 3.

A handle 50 is fixed to one of the axles 44 (see FIGS. 3 and 4). The handle includes an inner portion 52, and an outer portion 54, which are interconnected by means of a hinge 56. A support member 58 is also fixed to the axle and underlies the handle 50. The support member 58 carries a length of channel section 60 which has side walls 62 between which the handle 50 is positioned.

The support 58 has a hole 64 and the handle 50 has a projection 66 which is engageable with the hole.

The support 58 has a pin 68 fixed to it. A spring 70, engaged with the pin, biases a washer 72 towards the support member 58. The movable portion 54 of the handle has a slot 74 which is engageable with the pin. With the components so engaged the spring 70 exerts a biasing force on the movable portion of the handle which ensures that the movable portion remains positioned in the channel 60 and, in addition, the projection 66 remains engaged with the hole 64. Under these conditions rotational force may be applied to the door by means of the handle.

A cam 76 is mounted on one side wall 30. The cam has an active surface which is inclined and which is positioned so that when the handle 50 reaches a predetermined orientation relatively to the housing, the cam surface acts on the movable portion 54 and displaces it outwardly away from the side wall of the housing. This movement is against the biasing action of the spring 70 and it causes the projection 66 to disengage from the hole 64 and the movable portion 54 to disengage from the channel 60. The hinge 56 allows this movement to take place. At this position the handle therefore becomes inoperative.

FIG. 1 shows the apparatus of the invention with the door 12 in a controlled closed position at which it blocks the inlet 18. A lower edge of the door contacts a bottom wall of the housing at a point 80 and in this way further rotation of the door about the axles 44, in an anticlockwise direction, is prevented. The door is movable from the controlled closed position shown in FIG. 1 by means of the handle 50 so as to allow material to pass from the inlet 18 through the passage 16 and to the outlet 20 in a regulated manner. The door is opened by causing it to rotate in a clockwise direction about the axles 44. This operation is completely under the control of an operator.

It should be pointed out that the handle 50 can be manually controlled or alternatively use can be made of mechanical means, for example a hydraulically or pneumatically operated cylinder, to move the handle. The construction of the handle shown in FIGS. 3 and 4 is of course not restrictive for a similar working operation can be obtained with other structures. If material flow through the passage becomes excessive, for any reason, then an operator will naturally attempt to close the door and so restore it to the FIG. 1 position. If the force required for this operation is too high, and it is not possible to close the door, then the material flow in fact forces the door fully opened to a position at which the outer face 36 substantially uniformly opposes the closure 22. At this stage the door is so orientated that material passing through the passage 16 impinges on the outer ends of the ribs 40. The ribs are so situated on the door that the material flow in fact causes the door to rotate further clockwise. In this way a greater area of the ribs is brought into contact with the material passing through the passage and the door is rotated more forcefully and more rapidly further clockwise until it reaches the FIG. 2 position at which a lower edge of the door again contacts the lower wall of the housing at a contact point 82. Further rotation of the door in the clockwise direction is therefore effectively stopped and the flow rate of material through the passage is substantially reduced. To avoid undesirable pressure build up, the trailing edge of the door is in fact shaped and orientated so that a passage 84, of substantially reduced dimensions, is formed between the door 12 and the closure 22. This permits material to flow through the housing at a reduced rate. Preferably this rate is between 5% and 20% of the maximum flow rate of material and generally is of the order of 15% of the maximum possible flow rate. Stated otherwise the passage 84 permits the flow of approximately 15% of the material that would otherwise flow through the apparatus.

When the door is forced fully open by a sudden rush of material the handle naturally rotates together with the door. Under excess flow conditions the door is caused to move very rapidly and the handle similarly travels at high speed. The handle itself is dangerous to an operator and cause harm. It is for this reason that a handle construction of the kind shown in FIG. 3 and 4 is employed. When the door reaches a fully opened position, which is indicative of excess flow rates, the cam 76 causes disengagement of the handle from the door so that the handle is left in a harmless position while permitting free movement of the door.

The apparatus of the invention thus effectively and automatically, under excess flow rate conditions, operates to shut off, or at the very least reduce, the material flow.

With the door in the FIG. 2 position jumper bars or the like are passed through the holes 32 in the side walls 30 to provide a barrier which restrains movement of the material in the housing. The closure 22 may then be uncoupled and opened so that the material inside the passage 16, in the region of the door, can be manually removed. The lower closure 34 may also be removed to assist in the clearing operation. Thereafter the door is restored to the FIG. 1 position and the bars are removed so that material can again flow through the apparatus in a controlled manner.

The inspection cover 24 permits the interior of the housing to be viewed and inspected, even under working conditions.

The deflector 28 is useful under certain conditions, for example when an elongate object flows through the passage, for it causes such objects to be foreced downwardly towards the base of the housing, and in this way the likelihood of the operation of the door being fouled is minimized.

The door has been shown as being mounted on axles 44. It is possible to mount the door on rollers, runners or other guiding mechanisms which cause the door to move along a predetermined path. In this case the axles are dispensed with. It is also possible to mount the door so that its side walls are effectively outside the side walls of the housing and not inside as shown in FIG. 1. With this form of the invention the side walls of the housing have cut outs and the side walls of the door are effectively larger in size so that they overlap and provide a seal for the cut outs.

Another modification which can be made to the apparatus of the invention is to replace the ribs 40 with chains, cables, rods or the like which are suspended from the concave inner face 38. When the door reaches its fully opened position these members are orientated substantially in the same direction as the ribs and therefore engage with the material flow, in the manner described, thereby to cause the door to close. It is also possible to shape the door itself so that this type of action is achieved and this modification, particularly, is intended to fall within the scope of the present invention.

I claim:

1. A method for controlling the flow of material through a flow passage using a door which is movable in the passage and which has a generally curved outer wall of a size to substantially block the passage when it is in one position, and which includes a passage which has an upper wall which is substantially dome-shaped, comprising closing the passage by resting a lower end of the door on the lower wall of the passage while permitting some flow between the door and the dome-shaped portion of the upper wall of the passage, and disposing entraining elements on the door on the interior thereof so that the flow contacts the entraining elements and biases the door into a closed position.

2. A method according to claim 1 wherein the door is moved for closing until the end thereof opposite the first end rests on the lower wall of the passage is moved so that it is positioned adjacent the upper wall of the passage in spaced relationship to the dome-shaped portion thereof, and the opposite wall which was previously the top of the door now rests on the lower wall of the passage, and arranging the door so that it leaves some space between the upper wall, of the door which is close to the upper wall, and including positioning the entraining elements of the door so that the material flowing through the passage acts on the entraining elements and biases the door in an opened position.

3. An apparatus for controlling material flow which includes a housing in which is formed a passage through which the material passes, and at least one door which is located in the passage, said door, when in a closed position, presenting a first surface subject to oncoming material flow through the passage, a control device connected to said door for moving said door, said door being movable by said control device to regulate the rate of material flow through the passage, said door being movable by the material flow, when the rate of material flow through the passage reaches a predetermined level, into a blocking position at which the said first surface is presented to outgoing material flow from the passage and at which the door at least substantially reduces the rate of material flow through the passage, wherein the control device includes a handle which is engaged with the door, the apparatus including means for disengaging the handle from the door when the door moves to a predetermined position.

4. An apparatus for controlling material flow, comprising a housing defining a flow passage having upper and lower walls and side walls on each side, said upper wall having a dome-shaped wall portion spaced from said inlet, a door in said housing having an axle pivotally supporting said door for rotation about a substantially horizontally axis and having an outer circumferentially extending wall spaced from said dome-shaped portion in all positions of its pivotal movement and having a first end which rest on said lower wall in a closed position in which it has an opposite second end spaced only slightly from said dome-shaped wall, said opposite second end resting on said lower wall in an opened position leaving a larger spacing of said first end from said upper wall, and entraining means carried on the interior of said door positined to entrain material and to bias said door in both an opened and closed position.

5. An apparatus according to claim 4, wherein said upper wall has an inlet portion with an inspection opening, an angle sectioned inspection opening member having a substantially horizontal wall hinged to said side walls and a downwardly extending front wall joining said upper wall, a deflector adjacent said inspection opening projecting into said flow passage from said upper wall.

* * * * *